United States Patent
Greve (10) Patent No.: US 6,499,587 B1
(45) Date of Patent: Dec. 31, 2002

(54) PLASTIC MODULES, CONVEYOR BELTS AND METHODS FOR ASSEMBLING AND DISASSEMBLING PIVOTABLY CONNECTED PLASTIC MODULES

(75) Inventor: Christopher G. Greve, Covington, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/641,907

(22) Filed: Aug. 21, 2000

(51) Int. Cl.[7] .............................................. B65G 17/06
(52) U.S. Cl. ...................................................... 198/853
(58) Field of Search ................................ 198/850, 853, 198/851

(56) References Cited

U.S. PATENT DOCUMENTS

| | | |
|---|---|---|
| 4,709,807 A | 12/1987 | Poerink |
| 4,765,454 A | 8/1988 | Hodlewsky et al. |
| 4,893,710 A | 1/1990 | Bailey et al. |
| 4,972,942 A | 11/1990 | Faulkner |
| 4,974,724 A | 12/1990 | Lapeyre |
| 5,083,660 A | 1/1992 | Horton |
| 5,105,938 A | 4/1992 | Tan |
| 5,123,524 A | 6/1992 | Lapeyre |
| 5,156,264 A | 10/1992 | Lapeyre |
| 5,174,438 A | 12/1992 | Witham et al. |
| 5,217,110 A | 6/1993 | Spangler et al. |
| 5,253,749 A | 10/1993 | Ensch |
| 5,303,818 A | 4/1994 | Gruettner et al. |
| 5,332,084 A * | 7/1994 | Greve ....................... 198/853 |
| 5,335,768 A | 8/1994 | Schladweiler |
| 5,435,435 A | 7/1995 | Chiba et al. |
| 5,439,099 A | 8/1995 | Bos et al. |
| 5,482,156 A * | 1/1996 | Damkjaer .................... 198/853 |
| 5,598,916 A | 2/1997 | Horton et al. |
| 5,645,160 A | 7/1997 | Palmaer et al. |
| 5,662,211 A | 9/1997 | Quentin |
| 5,816,390 A | 10/1998 | Stebnicki |
| 5,826,705 A | 10/1998 | Ramsey et al. |
| 5,899,322 A | 5/1999 | Gamble, Jr. |
| 5,904,241 A | 5/1999 | Verdigets et al. |
| 5,960,937 A | 10/1999 | Stebnicki et al. |
| 5,996,776 A * | 12/1999 | Zijderveld .................. 198/853 |

OTHER PUBLICATIONS

*Intralox Engineering Manual, Modular Plastic Conveyor Belts* dated 9/98 and nineteen insert pages entitled Series 400 (2 pages), Series 800 (7 pages), Series 900 (2 pages), Series 1100 (2 pages), Series 1400 (2 pages), and Series 4000 (4 pages).

* cited by examiner

*Primary Examiner*—Kenneth W. Noland
(74) *Attorney, Agent, or Firm*—Leydig, Voit & Mayer, Ltd.

(57) ABSTRACT

Modules for plastic conveyor belts may comprise a body and a resilient stop cooperatively arranged with the body. The body has at least one aperture which may receive a pivot rod. The resilient stop is preferably bendable in the direction of insertion of the pivot rod and/or in the direction toward the aperture or the pivot axis. Methods of assembling plastic conveyor modules may include bending a resilient stop in the direction of insertion of the pivot rod, and methods of disassembling plastic conveyor modules may include bending a resilient stop toward a pivot rod. Methods of maintaining pivot rods in position in an aperture of a plastic conveyor module may include reacting a resilient stop against axial outward movement of the pivot rod.

64 Claims, 10 Drawing Sheets

PLASTIC MODULES, CONVEYOR BELTS AND METHODS FOR ASSEMBLING AND DISASSEMBLING PIVOTABLY CONNECTED PLASTIC MODULES

TECHNICAL FIELD OF THE INVENTION

The present invention relates to plastic modules, conveyor belts formed from plastic modules, and methods for assembling and disassembling pivotably connected plastic modules.

BACKGROUND OF THE INVENTION

Conveyor belts formed from plastic modules are used in a wide variety of industrial and commercial settings to transport a myriad of items, e.g., everything from apples to zippers. Each module has a body which may be solid or may comprise a lattice of structural elements or struts, and the upper surfaces of the modules serve as the conveying surface for the items being transported. The ends of the body have one or more holes or apertures in them, and adjacent plastic modules are pivotably connected to one another end-to-end, and/or side-to-side, by pivot rods inserted in the apertures. For example, the apertures at one end of the body of one plastic module are aligned with the apertures at the other end of the body of the adjacent plastic module and a pivot rod may be inserted through the aligned apertures, pivotably connecting the plastic modules. Any number of plastic modules may be connected end-to-end, as well as side-by-side, by pivot rods to form a conveyor belt of any convenient length and width. For example, thousands or more plastic modules may be pivotably connected by thousands of pivot rods to form a conveyor belt hundreds of feet long.

While plastic conveyor belts have proven highly reliable, the assembly of conventional plastic conveyor belts has been a difficult, time-consuming process. For example, many conventional modules include a stop member. Before a pivot rod can be inserted in one direction into the apertures of the modules, a stop member must be moved in another direction out of the path of insertion of the pivot rod. Once the pivot rod is fully inserted, the stop member may be returned to its original position, locking the pivot rod in place within the apertures. This process of moving a stop member in one direction, inserting a pivot rod in another direction, and returning the stop member to its original position greatly complicates the process of forming a conveyor belt, especially a conveyor belt having thousands of modules and pivot rods.

SUMMARY OF THE INVENTION

The present invention has many advantages and overcomes several problems associated with conventional plastic module conveyor belts, including the problems set forth above.

In accordance with one aspect of the invention, a module for a plastic conveyor belt comprises a body and a resilient stop cooperatively arranged with the body. The body has at least one aperture for receiving a pivot rod. The resilient stop is bendable in the direction of insertion of a pivot rod in the aperture to an extended position allowing a pivot rod to be positioned in the aperture. The resilient stop further has a non-extended position which resists removal of a pivot rod from the aperture.

In accordance with another aspect of the invention, a conveyor belt comprises first and second plastic modules, a pivot rod, and a resilient stop. The pivot rod pivotably connects the first and second plastic modules along a pivot axis. The resilient stop has a non-extended position which resists removal of the pivot rod. Further, the resilient stop is bendable in the direction of the pivot axis toward the pivot rod to an extended position which allows removal of the pivot rod from the first and second plastic modules.

In accordance with another aspect of the invention, a method of assembling first and second plastic conveyor modules comprises inserting a pivot rod into apertures in plastic conveyor modules, including bending a resilient stop in the direction of insertion of the pivot rod. The method further comprises positioning the pivot rod in the apertures, including moving the pivot rod beyond the resilient stop wherein the resilient stop returns to a position resisting removal of the pivot rod.

In accordance with another aspect of the invention, a method of disassembling first and second pivotably connected plastic conveyor modules comprises bending a resilient stop in the direction of the pivot rod axis and removing the pivot rod from apertures in the first and second conveyor modules.

In accordance with another aspect of the invention, a method of maintaining a pivot rod in an aperture of a plastic conveyor module comprises reacting a resilient stop against outward axial movement of the pivot rod, the resilient stop extending at an obtuse angle toward the pivot rod.

In accordance with another aspect of the invention, a module for a plastic conveyor belt comprises a body and a resilient stop. The body has at least one aperture defining an axis. The resilient stop is cooperatively arranged with the body. The resilient stop has a non-extended position and is bendable in the direction of the axis toward the aperture to an extended position. The resilient stop is radially spaced from the axis a greater distance in the extended position than in the non-extended position.

In accordance with another aspect of the invention, a module for a plastic conveyor belt comprises a body and a resilient stop cooperatively arranged with the body. The body has at least one aperture. The resilient stop has a non-extendable position which occludes at least a portion of the aperture. The resilient stop is bendable in a direction toward the aperture to an extended position which does not occlude any portion of the aperture.

Modules, conveyor belts, and methods embodying the invention represent a significant advance in the art. Not only is the pivot rod reliably held in position by a stop member pivotably connecting the modules, but the assembly of the modules to form the conveyor belt is remarkably easy. As the pivot rod is inserted into the apertures of the modules, the pivot rod can contact the stop member and bend the stop member in the direction of insertion to an extended position out of the way of the pivot rod. Once the pivot rod is fully inserted and positioned within the apertures, the pivot rod no longer contacts the stop member, which, in turn, moves to a non-extended position blocking removal of the pivot rod. This greatly facilitates automation of the assembly of the plastic modules to form a conveyor belt because no separate step is needed to move a stop member out of the way of the pivot rod. The pivot rod automatically moves the stop member to an extended position simply by inserting the pivot rod straight into the apertures. Further, the pivot rod can be inserted into the apertures without bending the pivot rod or negotiating any non-linear paths through the apertures.

DESCRIPTION OF EMBODIMENTS

Figure 1:
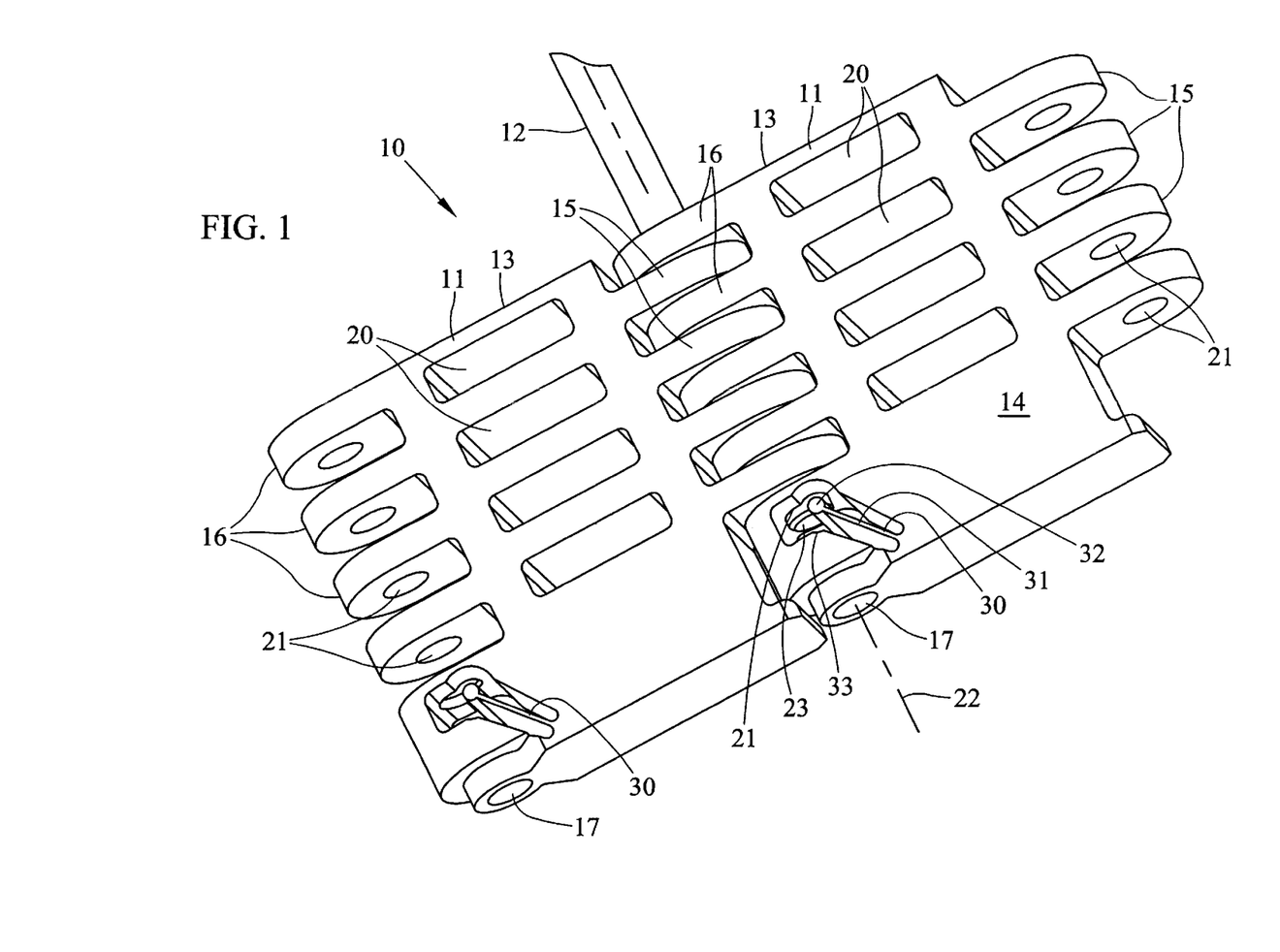
FIG. 1 is an oblique view of a portion of a conveyor belt.
Figure 2:
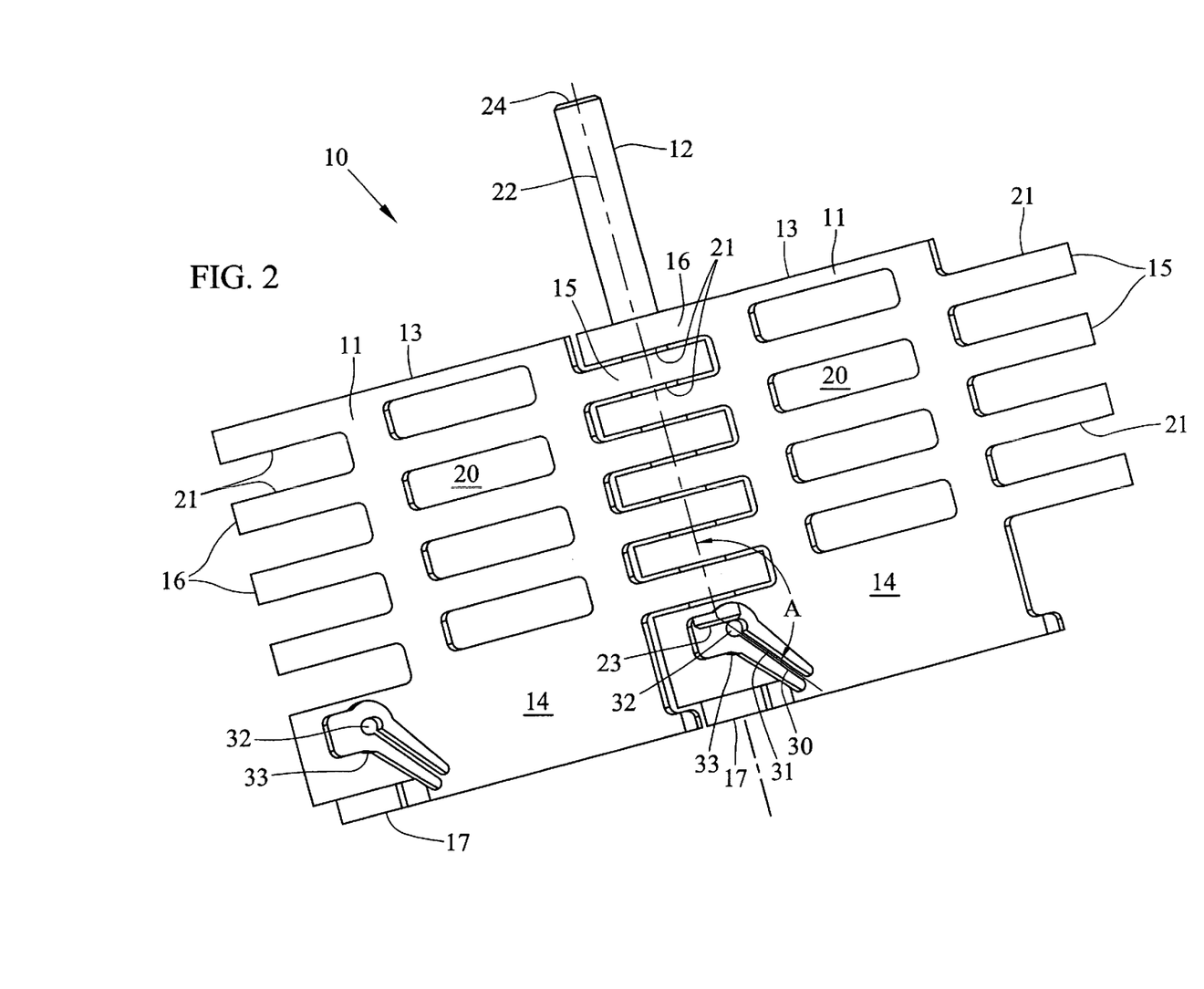
FIG. 2 is a top, slightly oblique view of the portion of the conveyor belt shown in FIG. 1.
Figure 3:
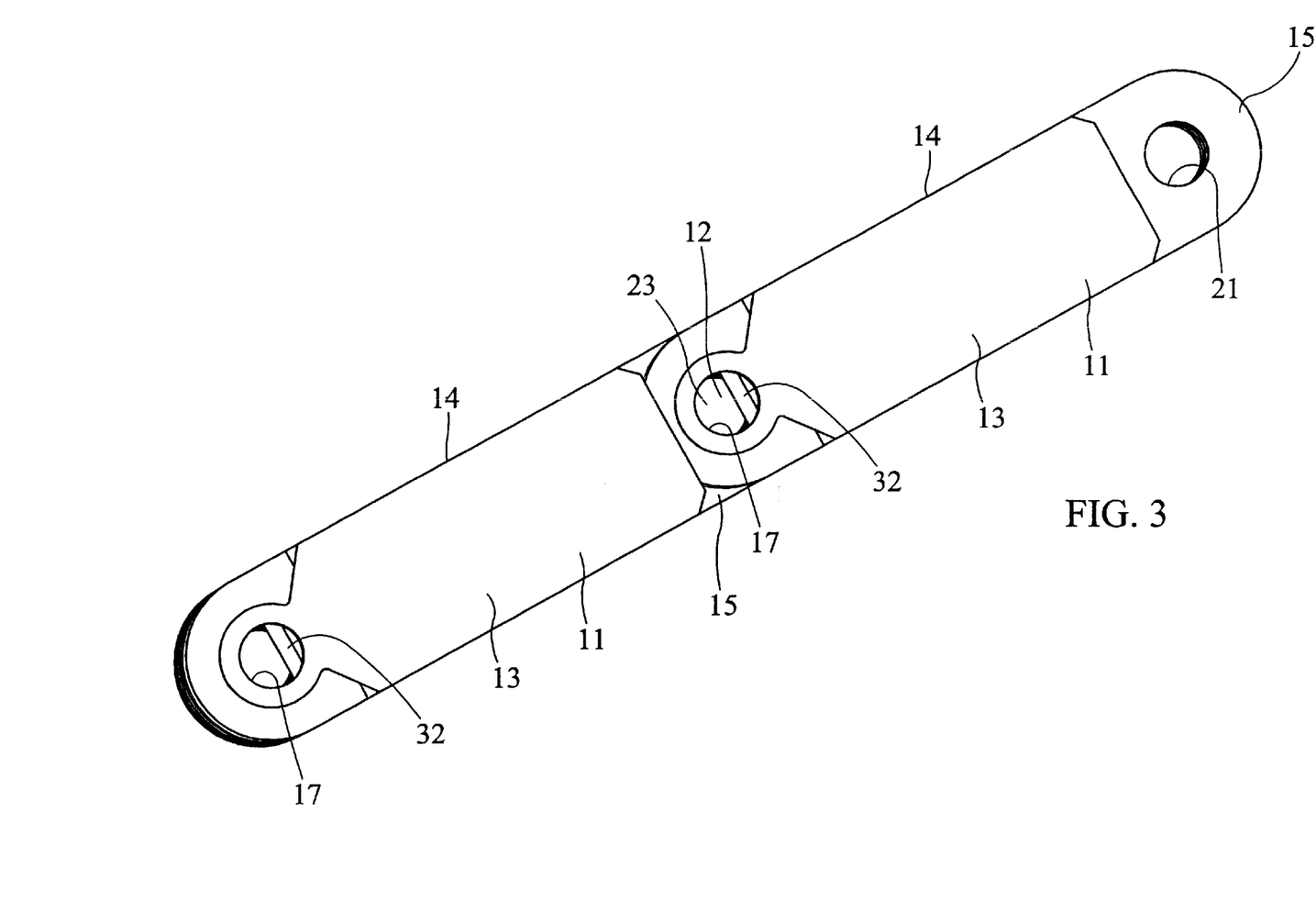
FIG. 3 is a side, slightly oblique view of the portion of the conveyor belt shown in FIG. 1.

One example of a portion of a conveyor belt embodying the invention is shown in FIGS. 1–3. The conveyor belt 10 comprises first and second plastic modules 11 pivotably connected by a pivot rod 12. The modules may differ from one another in a variety of ways, but in many preferred embodiments the modules 11 are identical to one another. Each module 11 includes a body 13 having a conveying surface 14 used to transport items along the conveyor belt 10. The body 13 shown in FIGS. 1–3 has a substantial thickness, link ends 15, 16 on each end of the module 11, and a regular arrangement of openings 20 in the conveying surface 14 of body 13. However, the configuration of the body of a plastic module is not limited to the configuration of the body 13 shown in FIGS. 1–3. Rather, the body may have any of a wide assortment of configurations. For example, the body may be largely solid or it may comprise a lattice of thick or thin elements or struts defining a conveying surface having a regular or irregular array of openings. The body of the module is preferably formed from a polymeric material, including a plastic material such as a polypropylene, polyethylene, acetal, polyamide, e.g., nylon, or polyetherimide, e.g., GE Plastics ULTEM plastic. In many preferred embodiments, the body is formed as a single, unitary piece, e.g., by injection molding. However, the body may be machined as a unitary piece or may be a multi-piece structure. Some examples of module bodies are disclosed, for example, in Lapeyre U.S. Pat. No. 5,156,264, which is incorporated herein by reference.

Regardless of the configuration of the body, each module preferably includes one or more apertures near the opposite ends of the body. For example, as shown in FIGS. 1–3, the body 13 of each module 11 may include an aperture 21 in each link end 15, 16. The apertures 21 in a set of link ends 15, 16 at one end of the body 13 are preferably aligned and define an axis 22, preferably a straight linear axis 22, which extends through the aligned set of apertures 21 and through an opening 17 in one or both side edges of the body 13. The set of apertures 21 at one end of a body 13 of one module 11 are aligned with the set of apertures 21 at another end of the body 13 of another module 11, aligning the axes of the two sets of apertures 21, and a pivot rod 12 is positioned within the aligned sets of apertures 21. The pivot rod 12 then defines a pivot axis coincident with the axes 22 of the sets of apertures 21. Any number of modules 11 may be connected end-to-end, as well as side-by-side, by pivot rods 12 to form a conveyor belt 10 of any suitable length, and width. The conveyor belt may be driven by any suitable driving mechanism. For example, the driving mechanism may include a motor attached to a drive shaft which has one or more sprockets that engage the conveyor belt. Examples of conveyor belts, drive mechanisms, and other components are disclosed, for example, in Intralox Engineering Manual—Modular Plastic Conveyor Belts, Sep. 19, 1998, which is available from Intralox, Inc. of Harahan, La. U.S.A., and is incorporated herein by reference.

The pivot rod 12 shown in FIGS. 1–3 has first and second opposite ends 23, 24 which may be identical or may differ from one another. The ends 23, 24 may have a shape, such as a beveled or dome shape, which facilitates insertion of the pivot rod 12 into the apertures 21. For many preferred embodiments, the pivot rod 12 is a "headless" pivot rod and the ends 23, 24 are preferably identical. Headless pivot rods have many advantages. For example, they may be inserted in the aligned sets of apertures of the modules from either end of the pivot rod. Alternatively, the pivot rod may include a head at one end which has a larger dimension, e.g., a larger diameter, than the shaft of the pivot rod. The portion of the pivot rod positioned in the apertures, e.g., the shaft of the pivot rod or the entire rod, preferably has a diameter about equal to or less than the diameter of the apertures in the modules. The pivot rods may be formed from any sufficiently strong, durable material, including metal or a plastic material.

The module further includes a resilient stop operatively associated with the body to prevent undesired axial movement and/or unintended removal of the pivot rod, e.g., during operation of the conveyor belt. The resilient stop may be cooperatively arranged with the body in a variety of ways to allow the pivot rod to be easily inserted and reliably positioned in the apertures of the modules. In many preferred embodiments, the resilient stop 30 is a unitary portion of the body 13, e.g., unitarily injection molded along with the remainder of the body 13, as shown in FIGS. 1–3. Alternatively, the resilient stop may be a portion of a separate part which is connected, e.g., mechanically attached or bonded, to the body, e.g., at the edge of the body, in the vicinity of the end of the pivot rod. For example, the resilient stop may comprise an insert which is fitted within a fitting in the body in the vicinity of the end of the pivot rod. The resilient stop may then be removed and replaced, e.g., in the event it breaks.

The resilient stop is preferably configured to have a non-extended or at rest position which may occlude all or at least a portion of the aperture(s) of the module and/or interferes with axial movement of the pivot rod out of the apertures of the modules, thereby preventing removal of the pivot rod. In the non-extended position, the resilient stop, e.g., a tip portion of the resilient stop, may be significantly spaced axially from the pivot rod, e.g., the end of the pivot rod, allowing the pivot rod some axial movement within the apertures before it contacts the stop. However, the resilient stop is preferably axially located proximate the pivot rod, substantially limiting axial movement of the pivot rod within the apertures. Preferably, the resilient stop is located, and/or the end of the pivot rod is shaped, e.g., beveled, in a manner that not only limits the axial movement of the pivot rod but also allows the resilient stop to naturally return to its non-extended position once the pivot rod is fully inserted in the apertures. Further, the resilient stop is preferably arranged to react against axial outward movement of the pivot rod, e.g., providing increasing reactive force with increasing outward axial movement of the pivot rod, and/or to provide a physical limit to axial movement of the pivot rod out of the apertures.

In addition to the non-extended position, the resilient stop is preferably resiliently bendable in the direction of the axis toward the apertures or the pivot rod to an extended position. The resilient stop is bendable in the axial direction toward the aperture or pivot rod where there is an axial component of movement of the resilient stop, e.g., the tip portion and/or the arm, in the direction of the aperture or pivot rod. There may also be a radial component of movement, e.g., away from the aperture/pivot axis. In the extended position, the resilient stop preferably occludes no portion of the aperture and allows unrestricted axial movement of the pivot rod into or out of the apertures of the modules. In the extended position, the resilient stop, e.g., the tip portion, is preferably radially spaced a greater distance from the axis of the apertures or the pivot rod than in the non-extended position.

The resilient stop may be structured in a wide variety of ways. For example, the resilient stop 30 may be formed of no more than a single resilient arm 31 which extends from the body 13 of the module 11 and terminates in a tip portion 32, e.g., proximate the end of the pivot rod 12, in the non-extended position as shown in FIG. 2. The resiliently bendable arm may have any of numerous configurations. The arm may be solid or hollow; may have an irregular cross-section or a regular cross-section such as a circular or rectangular cross-section; may have a uniform cross-section or a non-uniform cross-section such as a cross-section that tapers along the length of the arm from, for example, a thicker cross-section nearer the body to a thinner cross-section nearer the tip portion; may be long or short; may be straight or curved; and may be formed from any sufficiently resilient material such as a metal, a polymer, or an elastomer. The tip portion and the body of the module may be formed of harder materials than the resilient arm in a co-injection molding process, for example. In the illustrated embodiment, the resiliently bendable arm 31 is preferably formed of a plastic material unitarily injection molded along with the body 13 and preferably comprises a solid, straight strut having a uniform rectangular cross-section from the body 13 to the tip portion 32. The length of the arm is preferably in the range from about 0.15 inch to about 0.4 inch, preferably about 0.25 inch.

The arm may extend toward the pivot rod perpendicularly or at an acute angle to the aperture/pivot axis. However, the arm preferably extends at an obtuse angle, as shown in FIG. 2. For example, the arm may extend toward the pivot rod at an obtuse angle A within the range of about 120 degrees to about 150 degrees, preferably about 135 degrees, to the aperture/pivot axis.

The tip portion of the stop may also be structured in a wide variety of ways. In the illustrated embodiment, the tip portion 32 preferably has a generally rounded shape such as a cylindrical configuration having an axis which is generally perpendicular to the axis of the apertures or the pivot rod. The rounded shape allows the pivot rod 12 to be moved past the tip portion 32 of the stop 30, e.g., during insertion, without catching or being held up by the stop 30. Alternatively, the tip portion may have any other suitable shape, e.g., spherical, angled, or tapered, or may be eliminated entirely. However, many preferred embodiments include a tip portion because it provides additional mass on the end of the arm and provides better wear.

In a preferred mode of operation, the tip portion 32 of the resilient stop 30 partially occludes the apertures 21 in the non-extended position as shown in FIG. 3, interfering with any significant axial movement of the pivot rod 12 out of the apertures 21 and preventing unintended removal of the pivot rod 12. However, the resilient stop may interfere with and resist axial movement of the pivot rod without occluding any portion of the apertures. For example, if the pivot rod includes a head having a larger diameter than the apertures, the resilient stop may be arranged to have a non-extended position in which the tip portion is clear of the apertures but axially interferes with the region of the pivot rod head that extends radially beyond the apertures, preventing the pivot rod from moving axially outward from the apertures.

Figure 4:
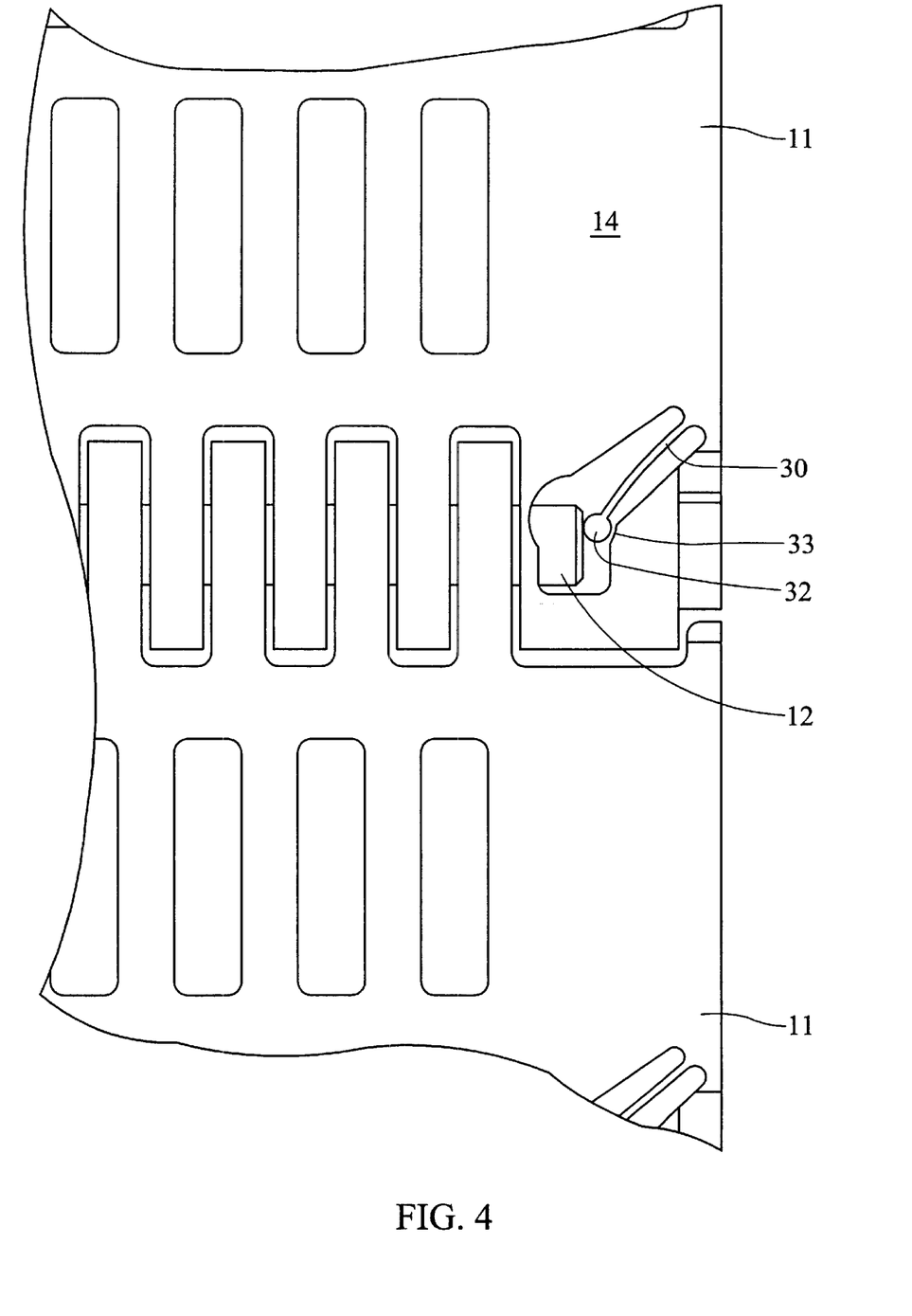
FIG. 4 is a top plan view of a portion of the conveyor belt of FIG. 1.

If the pivot rod 12 is forced out of the apertures 21, e.g., during operation of the conveyor belt 10, the end 23 of the pivot rod 12 bears against the tip portion 32 of the resilient stop 30, resiliently bending the arm 21 from the non-extended position in the general direction of the axis 22 away from the apertures 21. The farther the resilient arm 31 bends away from the non-extended position, the greater the tip portion 32 reacts against the pivot rod 12 and forces the end 23 of the pivot rod 12 back into position within the apertures 21. In the event the outward axial force of the pivot rod 12 overcomes the reactive force of the resilient stop 30, the resilient stop 30 is preferably arranged to physically limit axial outward movement of the pivot rod 12. For example, as shown in FIG. 4, the resilient stop 30 may be disposed near an abutment portion 33 of the body 13. If the resilient arm 31 bends too far outward from the non-extended position, the tip portion 32 contacts the abutment portion 33 of the body 13, transferring all of the load to the abutment portion 33 and preventing any further axial movement of the pivot rod 12 out of the apertures 21.

Disassembling the pivotably connected adjacent modules 11 is easy. For example, the resilient stop 30 is simply resiliently bent axially inwardly in the direction of the apertures 21 or the pivot rod 12 to an extended position where the tip portion 32 is clear of the end 23 of the pivot rod 12. The tip portion 32 or the resilient arm 31 may be manually or robotically contacted through the opening in the conveyor surface 14 and bent axially inwardly to the extended position. The pivot rod 12 may then be removed from the apertures 21 of the link ends 15, 16 of the modules 11 by sliding the pivot rod 12 axially outwardly past the tip portion 32 of the stop 30. The pivot rod 12 may be removed, for example, by mechanically grasping and pulling the end 23 of the pivot rod 12 out of the apertures 21 or by pushing the pivot rod 12 out of the apertures 21 from the opposite end 24. For many embodiments, the pivot rod may be removed by first directing a second pivot rod past the resilient stop until the end of the second pivot rod abuts the end of the first pivot rod in the apertures of the modules. By directing the second pivot rod past the resilient stop, the resilient stop is bent to the extended position. With the resilient stop in the extended position, the first pivot rod may be pushed out of the apertures from the opposite end, removing both the first and the second pivot rods. Once the pivot rod 12 is removed from the apertures 21 of the modules 11, the adjacent modules 11 fall away from one another and the resilient stop 30 naturally returns to its non-extended position.

Assembling first and second plastic conveyor modules and forming a conveyor belt is remarkably easy. For example, the link ends 15, 16 of an adjacent pair of plastic conveyor modules 11 may be interleaved and the apertures 21 in one set of link ends 15 may be aligned with the apertures 21 in the other set of link ends 16. The pivot rod 12 is then simply inserted axially into the aligned apertures 21 along the aperture/pivot axis 22. As the pivot rod 12 is inserted, it automatically contacts the resilient stop 30, e.g., the tip portion 32, resiliently bending the arm 31 axially inwardly in the direction of insertion to the extended position where the tip portion 32 is clear of the apertures 21 and the pivot rod 12. As the resilient stop 30 moves from the non-extended position to the extended position, the tip portion 32 also moves axially toward the apertures 21 and radially outwardly away from the aperture/pivot axis 22. If the pivot rod 12 is headless, the far end 24 of the pivot rod 12 may immediately contact the tip portion 32 upon insertion and bend the resilient arm 31 to the extended position.

As the pivot rod 12 is directed toward the apertures 21, the resilient stop 30, e.g., the tip portion 32, bears against the pivot rod 12 laterally. For many preferred embodiments, the module preferably includes a guide positioned opposite the end of the resilient stop, e.g., opposite the tip portion, which reacts against the lateral force of the resilient stop and guides the pivot rod smoothly into the apertures without any catches that would hang up the pivot rod. The guide may have any suitable configuration, including a tapered or curved configuration, and any suitable length. In the embodiment illustrated in FIG. 5, the guide 34 may be configured as a straight channel and it may extend opposite the resilient stop 30 from the side edge of the body 13 to the aperture 21. The guide 34 preferably has a smooth surface without any catches, such as ledges or other discontinuities, and opens evenly into the aperture 21. As the pivot rod 12 slides toward the aperture 21, the resilient stop 30 forces the pivot rod 12 against guide 34 which reacts against the force of the resilient stop 30 and delivers the pivot rod 12 smoothly to the aperture 21. The resilient stop 30 remains at the extended position as the shaft of the pivot rod 12 slides along the tip portion 32 into the apertures 21. Once the near end 23 of the pivot rod 12 clears the tip portion 32 and the pivot rod settles in position within the apertures 21 of the module 11, the resilient stop, e.g., the tip portion 32 and the arm 31, naturally returns to the non-extended position maintaining the pivot rod 12 in position within the apertures 21. In moving from the extended position to the non-extended position, the resilient stop 30, e.g., the tip portion 32, moves axially away from the apertures 21 and radially closer to the aperture/pivot axis 22.

If the pivot rod has a head, the insertion of the pivot rod may be similar to that of the headless pivot rod. Alternatively, as the pivot rod is inserted in the apertures, the far end and the shaft of the pivot rod may slide past the tip portion without contacting the tip portion or bending the resilient arm, maintaining the resilient stop in the non-extended position. Once the near end of the pivot rod with the head contacts the tip portion of the resilient stop, the tip portion and the resilient arm are bent inwardly in the direction of the apertures to the extended position, as well as radially outwardly, allowing the head of the pivot rod to slide past the tip portion of the resilient stop. As the tip portion moves to the extended position, it moves radially outwardly from the aperture/pivot axis. Once the head of the pivot rod clears the tip portion and the pivot rod settles in position within the apertures of the modules, the resilient stop, e.g., the tip portion and the resilient arm, naturally return to the non-extended position, maintaining the pivot rod in position within the apertures.

Whether the pivot rod is headless or headed, the assembly of a conveyor belt in this manner is ideally suited to an automation process. The apertures of each adjacent pair of modules are simply aligned and a pivot rod is inserted into the aligned apertures. The pivot rod may be inserted straight into the aligned apertures without being bent and without negotiating any nonlinear paths through the apertures. In the course of insertion, the pivot rod contacts the resilient stop and automatically moves the resilient stop from the non-extended position to the extended position. The guide smoothly directs the end of the pivot rod into the aperture. Further, the resilient stop automatically returns to the non-extended position holding the pivot rod in place once the pivot rod is fully inserted in the apertures. No separate steps are required to move the resilient stop from a non-extended position to the extended position or to return the resilient stop to the non-extended position beyond merely inserting the pivot rod. This greatly facilitates automation of the conveyor belt fabrication process and speeds assembly of the thousands of modules and pivot rods that may be involved.

Figure 6:
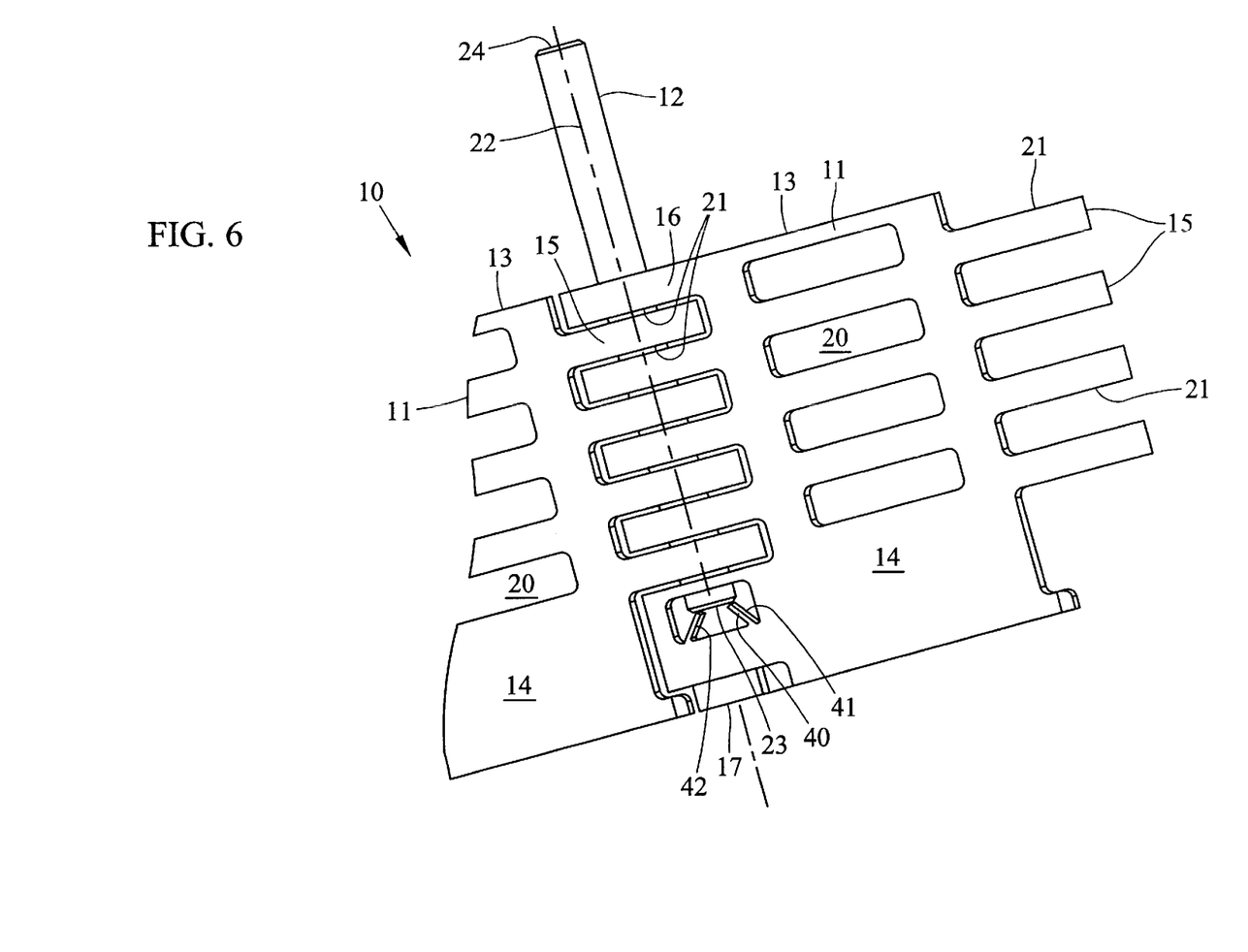
FIG. 6 is a top, slightly oblique view of a portion of another conveyor belt.
Figure 7:
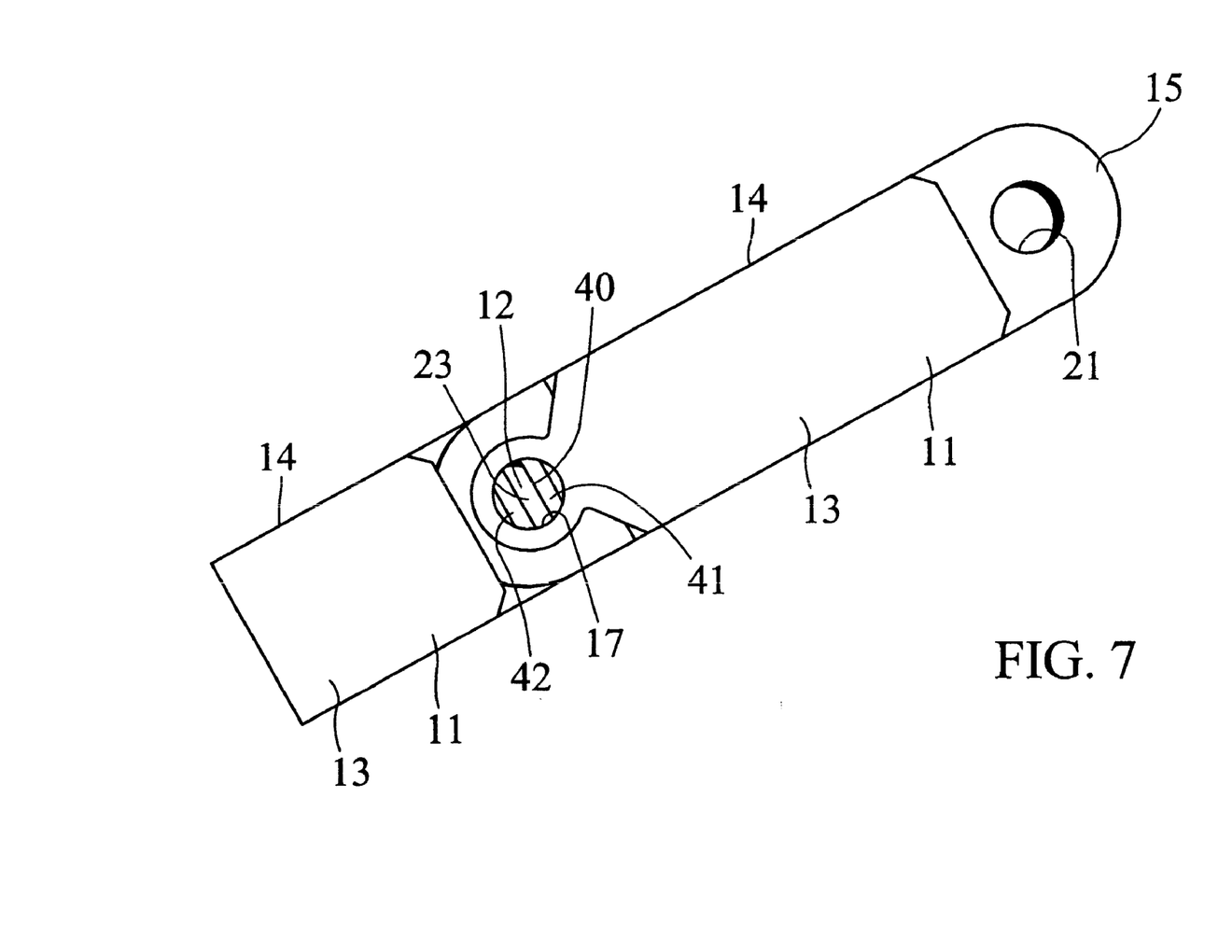
FIG. 7 is a side, slightly oblique view of the conveyor belt shown in FIG. 6.

Another example of a portion of a conveyor belt embodying the invention is shown in FIGS. 6 and 7. The conveyor belt 10 again comprises first and second plastic modules 11 pivotably connected by a pivot rod 12. However, the pivot rod 12 is maintained in place by resilient stop 40 that preferably comprises first and second resilient arms 41, 42. The arms may be different from one another, but, in many preferred embodiments, the arms 41, 42 are identical. The arms may extend at different angles to the aperture/pivot axis, but the arms 41, 42 preferably extend at the same angle, preferably at an obtuse angle, e.g., in the range from about 120 degrees to about 150 degrees, to the aperture/pivot axis 22. Further, while the ends of the arms may contact one another, in many preferred embodiments the ends of the arms 41, 42 are spaced from one another when the arms 41, 42 are in the non-extended position. One or both of the arms may include a tip portion and both the arms and the tip portion may be subject to many of the same variations as the resilient arm 30 and the tip portion 32 previously described. In the embodiment illustrated in FIGS. 6 and 7, the resilient arms 41, 42 are preferably unitarily molded with the body 13; each arm preferably comprises a short, e.g., about 0.2 inch, straight, solid strut having a uniform rectangular cross-section; and preferably neither arm 41, 42 has a tip portion.

In a preferred mode of operation, the resilient stop 40 shown in FIGS. 6 and 7 may function in a manner analogous to that of the resilient stop 30 shown in FIGS. 1–3. One or both of the arms 41, 42 of the resilient stop 40 may occlude all or a portion of the apertures 21 in the non-extended position, as shown in FIG. 6. Alternatively, if the pivot rod has a head, neither of the resilient arms need occlude any portion to the apertures. The resilient arms 41, 42 react against outward axial movement of the pivot rod 12 as previously disclosed with respect to the resilient stop 30 shown in FIGS. 1–3. However, while the resilient stop 40 may physically limit outward axial movement of the pivot rod 12, the arms 41, 42 preferably do not contact an abutment portion of the body. Rather, as the pivot rod 12 moves axially outwardly, the resilient arms 41, 42 bend from the non-extended position in the direction of the aperture/pivot axis 22 away from the apertures until the ends of the arms 41, 42 contact each other, preventing any further axial outward movement of the pivot rod 12. The ends of the arms 41, 42 may be shaped in any suitable manner to prevent the arms 41, 42 from bending past one another.

Disassembling the embodiment shown in FIGS. 6 and 7 may be analogous to disassembling the embodiment shown in FIGS. 1–3. For example, the resilient arms 41, 42 may be bent axially inwardly in the direction of the apertures 21 or the pivot rod 12 to an extended position where the ends of the arms 41, 42 are clear of the end 23 of the pivot rod 12. The pivot rod 12 may then be removed from the apertures 21 of the link ends 1S, 16 of adjacent modules 11 by sliding the pivot rod 12 axially outwardly past the ends of the resilient arms 41, 42 of the resilient stop 40. Once the pivot rod 12 is removed, the modules 11 fall away from one another and the resilient stop 40 naturally returns to its non-extended position.

Figure 5:
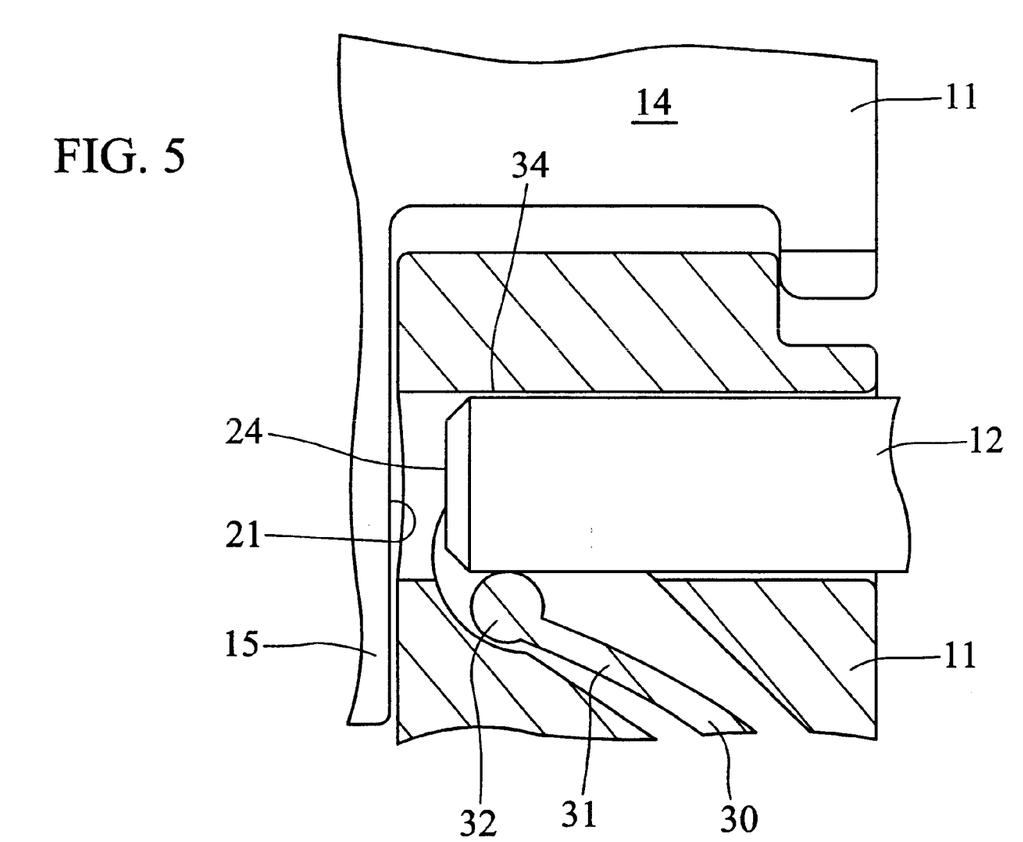
FIG. 5 is a partially sectioned top view of a portion of a conveyor belt.

Assembling the embodiment shown in FIGS. 6 and 7 may also be analogous to assembling the embodiments shown in FIGS. 1–3. The link ends 15, 16 of an adjacent pair of plastic conveyor modules 11 are interleaved and the apertures 21 in one set of link ends 15 are aligned with the apertures 21 in the other set of link ends 16. The pivot rod 12 is then simply axially inserted into the aligned apertures 21 along the apertures/pivot axis 22. As the pivot rod 12 is inserted, it automatically contacts the resilient stop 40, e.g., the end portions of the resilient arms 41 42, resiliently bending the arms 41, 42 axially inwardly in the direction of insertion from the non-extended position to an extended position where the ends of the arms 41, 42 are clear of the apertures 21 and the pivot rod 12. An advantage of the embodiment of the resilient stop 40 shown in FIGS. 5 and 6 is that the resilient arms 41, 42 react against insertion of the pivot rod with equal and opposite radially directed forces. Consequently, the pivot rod 12 is easily maintained on its path of insertion into the apertures 21 with or without a guide. Whether the pivot rod is headless or headed, once the near end 23 of the pivot rod 12 clears the ends of the resilient arms 41, 42 and the pivot rod 12 settles in position within the apertures 21 of the modules 11, the resilient stop 40, e.g., the arms 41, 42, naturally returns to the non-extended position, maintaining the pivot rod 12 in position within the aperture 21.

The various aspects of the invention have been disclosed with respect to several embodiments. However, the invention is not limited to these embodiments. For example, the invention includes one or more features of any of the embodiments combined with one or more features of the other embodiments. As an example, the tip portion 32 of the embodiment shown in FIGS. 1–3 may be disposed at the ends of each of the resilient arms 41, 42 of the embodiment shown in FIGS. 6 and 7. Further, one or more features of any of the embodiments may be eliminated without departing from the invention. As an example, the tip portion 32 of the resilient stop 30 of the embodiment shown in FIGS. 1–3 may be eliminated.

Figure 8:
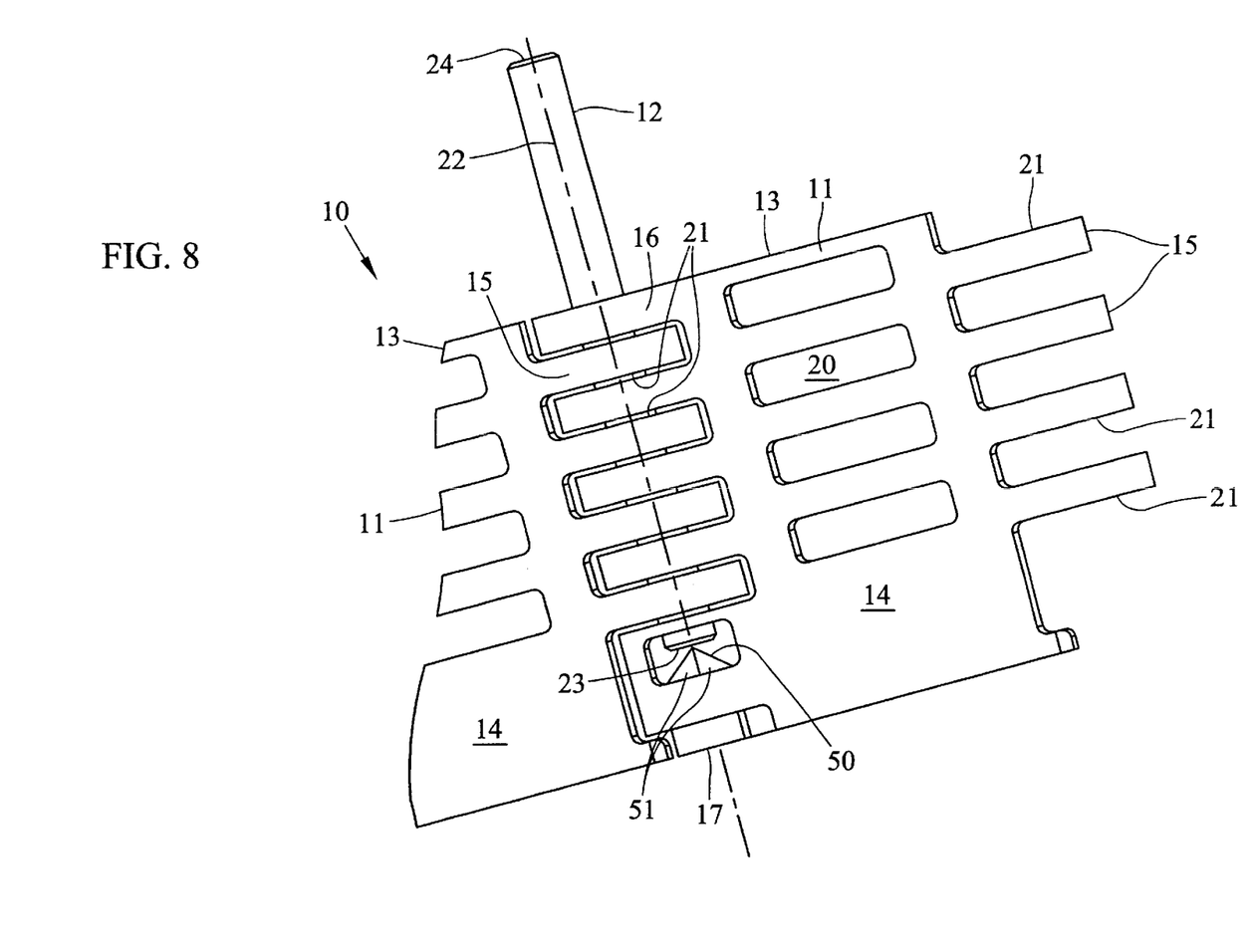
FIG. 8 is a top, slightly oblique view of a portion of another conveyor belt.
Figure 9:
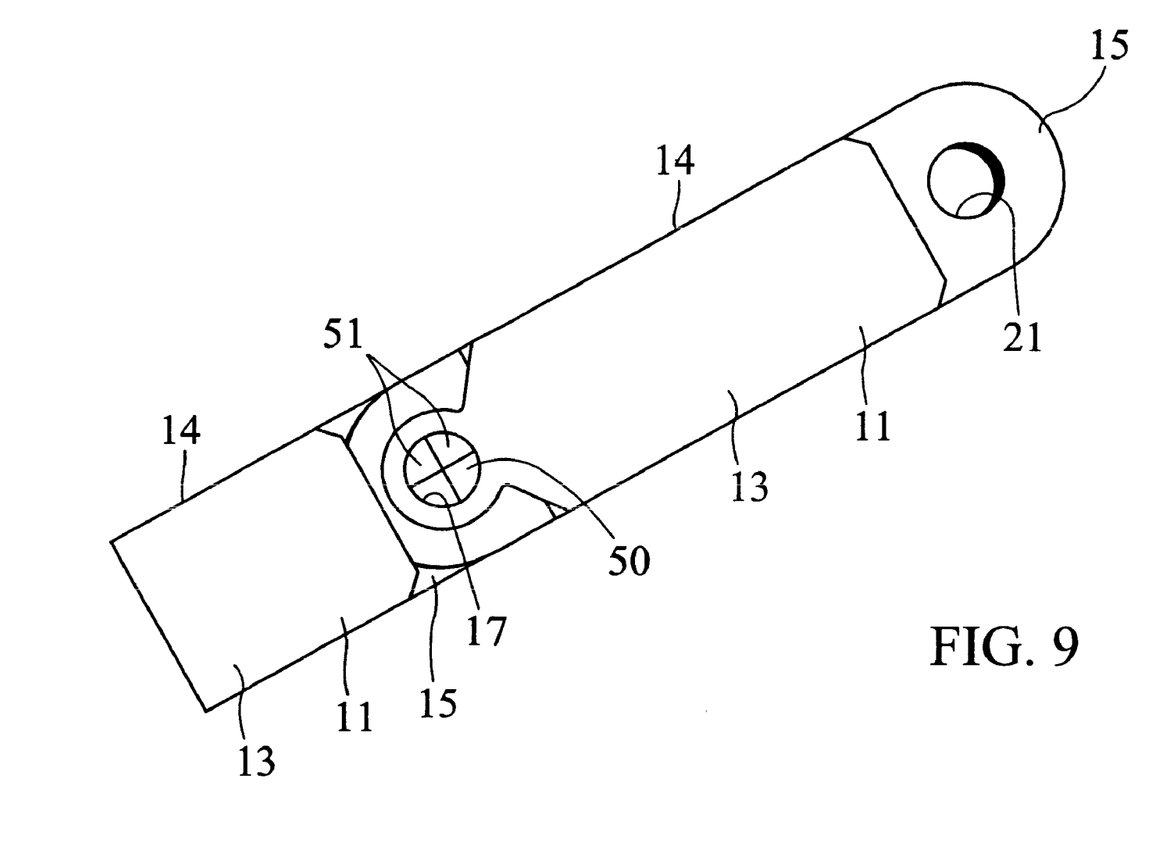
FIG. 9 is a side, slightly oblique view of the conveyor belt shown in FIG. 8.

In addition, one or more of the features of any of the embodiments may be modified or entirely different embodiments may be provided without departing from the invention. For example, a resilient stop may comprise a generally conical arrangement as shown in FIGS. 8 and 9, while the body 13 of the module 11 may be similar or identical to the body of the previously described modules. The resilient stop 50 may include three or more, e.g., four generally triangularly shaped flaps 51 which preferably extend inwardly toward the apertures 21 of the module 11 and contact one another in the non-extended position. The embodiment shown in FIGS. 8 and 9 may function in a manner similar to the previous embodiments. A pivot rod 12 may be inserted into the apertures 21 through the resilient stop 50, the flaps 51 moving in the direction of insertion to an extended position. Once the pivot rod 12 is fully in position in the apertures 21, the resilient flaps 51 return to the non-extended position.

Figure 10:
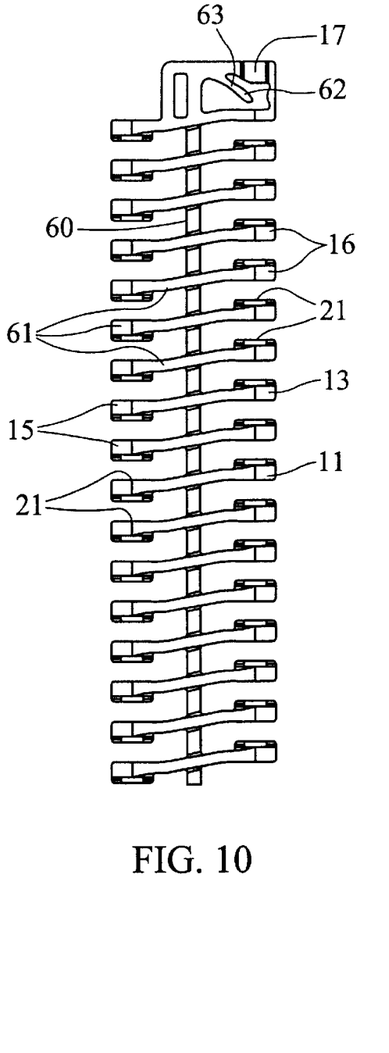
FIG. 10 is a top view of a conveyor module.
Figure 11:
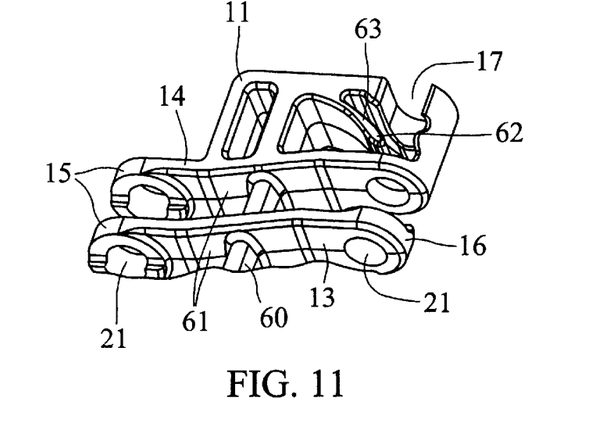
FIG. 11 is an oblique view of an end of the conveyor module shown in FIG. 10.
Figure 12:
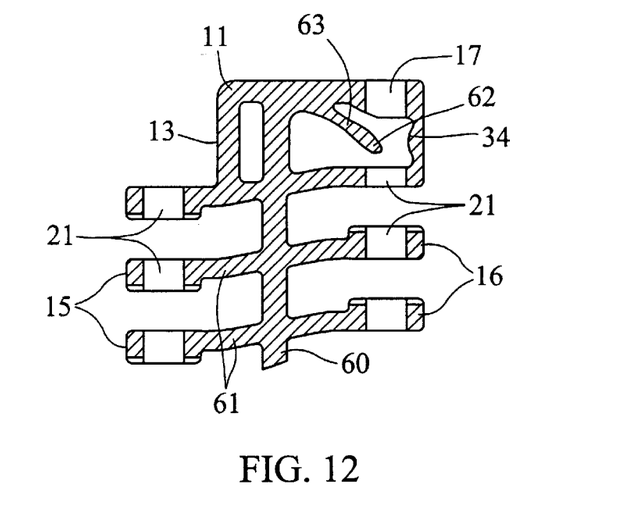
FIG. 12 is a top sectional view of the end of the conveyor module shown in FIG. 11.

An example of an entirely different embodiment is shown in FIGS. 10–12. The illustrated plastic module 11 may comprise a body 13 which includes an elongated strut 60 and a plurality of crosspieces 61 extending from the strut 60. The opposite ends of the crosspieces 61 may comprise the link ends 15, 16 including the apertures 21, which are preferably axially aligned.

Adjacent modules may be pivotably connected to one another by interleaving the link ends of the adjacent modules with the apertures in one set of link ends axially aligned with the apertures in the other set of link ends. A pivot rod is then inserted into the aligned apertures.

The resilient stop 62 of the embodiment shown in FIGS. 10–12 may comprise a resilient arm 63 preferably without a tip portion. The resilient arm 63 may be unitarily formed, e.g., injection molded, with the body 13 and preferably has non-uniform cross section, e.g., a cross section that is thinner near the body 13 and thicker near the end of the arm 63. The resilient stop 62 functions in a manner analogous to the resilient stops previous described. As the pivot rod is inserted through the opening 17 in the side edge of the body 13 and moved toward the apertures 21, the end of the pivot rod may contact and move the resilient stop 62 from a non-extended position toward the apertures 21 to an extended position, allowing the pivot rod to enter the apertures 21. The guide 34 smoothly directs the end of the pivot rod into the aperture 21. Once the pivot rod clears the resilient stop 62 and is fully positioned in the apertures 21, the resilient arm 63 returns to the non-extended position, locking the pivot rod in place in the apertures and securely connecting the adjacent modules.

As yet another example, a resilient stop may be cooperatively arranged with the body of a module at a location other than the side edge of the body and may interact with the pivot rod at a location other than the end of the pivot rod. For example, a resilient stop may be incorporated with one or more of the link ends of the module. The shaft of the pivot rod may then include a catch., e.g., a groove, which is positioned to cooperate with the resilient stop, e.g., an end or tip portion of the resilient stop, once the pivot rod is fully inserted in the apertures of the modules.

The present invention is thus not restricted to the particular embodiments described and illustrated but includes all embodiments and modifications that may fall within the scope of the appended claims.

What is claimed is:

1. A module for a plastic conveyor belt comprising:

a body having at least one aperture for receiving a pivot rod and a resilient stop cooperatively arranged with the body, the resilient stop being bendable in the direction of insertion of the pivot rod in the aperture to an extended position allowing the pivot rod to be positioned in the aperture and having a non-extended position which resists removal of the pivot rod from the aperture.

2. A module for a plastic conveyor belt comprising;

a body having at least one aperture defining an axis and a resilient stop cooperatively arranged with the body, wherein the resilient stop has a non-extended position and is bendable in the direction of the axis toward the aperture to an extended position, the resilient stop being radially spaced from the axis a greater distance in the extended position than in the non-extended position.

3. A module for a plastic conveyor belt comprising:
a body having at least one aperture and
a resilient stop cooperatively arranged with the body, the resilient stop having a non-extended position wherein the resilient stop occludes at least a portion of the aperture, the resilient stop being bendable in a direction toward the aperture to an extended position wherein the resilient stop does not occlude any portion of the aperture.

4. A conveyor belt comprising:
first and second plastic modules;
a pivot rod pivotably connecting the first and second plastic modules along a pivot axis; and
a resilient stop having a non-extended position which resists removal of the pivot rod and being bendable in the direction of the pivot axis to an extended position which allows removal or insertion of the pivot rod from the first and second plastic modules.

5. A method of assembling first and second plastic conveyor modules comprising:
inserting a pivot rod into apertures in the plastic conveyor modules including bending a resilient stop in the direction of insertion of the pivot rod and
positioning the pivot rod in the apertures including moving the pivot rod beyond the resilient stop wherein the resilient stop returns to a position resisting removal of the pivot rod.

6. A method of disassembling first and second pivotably connected plastic conveyor modules comprising:
bending a resilient stop toward a pivot rod in the direction of the pivot rod axis and removing the pivot rod from apertures in the first and second plastic conveyor modules.

7. A method of maintaining a pivot rod in position in an aperture of a plastic conveyor module comprising reacting a resilient stop against axial outward movement of the pivot rod, the resilient stop extending at an obtuse angle to the pivot rod.

8. The module of claim 1 wherein the resilient stop comprises a unitary portion of the body.

9. The module of claim 1 wherein the resilient stop is arranged to provide increasing reactive force with increasing axial movement of a pivot rod out of the aperture.

10. The module of claim 1 wherein the resilient stop includes a tip portion having a generally rounded shape.

11. The module of claim 1 wherein the resilient stop is free of a tip portion.

12. The module of claim 1 wherein the resilient stop has a cross section that is thicker near the end of the resilient stop and thinner near the body.

13. The module of claim 1 further comprising an abutment cooperatively arranged with the resilient stop, wherein the resilient stop is capable of contacting the abutment and transferring any load to the abutment.

14. The module of claim 1 further comprising a guide cooperatively arranged with the resilient stop to guide a pivot rod into the aperture.

15. The module of claim 14 wherein the guide comprises a smooth surface arranged to deliver a pivot rod into the aperture.

16. The module of claim 1 wherein the resilient stop comprises first and second bendable member arranged to react against a pivot rod with generally opposite forces.

17. The module of claim 1 wherein the resilient stop is disposed at an edge of the body.

18. The module of claim 1 wherein the body is formed from a polymeric material.

19. The module of claim 1 wherein the body is formed from a polymeric material and includes a plurality of apertures for receiving a pivot rod, the apertures defining an axis, and wherein the resilient stop is a unitary portion of the body and includes a member which is bendable in the direction of insertion of a pivot rod in the apertures, the bendable member in the non-extended position being arranged at an obtuse angle to the aperture axis and providing increasing reactive force with increasing axial movement of a pivot rod out of the apertures.

20. The module of claim 2 wherein the resilient stop comprises a unitary portion of the body.

21. The module of claim 2 wherein the resilient stop includes a tip portion having a generally rounded shape.

22. The module of claim 2 wherein the resilient stop is free of a tip portion.

23. The module of claim 2 wherein the resilient stop includes a bendable member having a tapered cross section.

24. The module of claim 23 wherein the cross section is thicker near the end of the bendable member and thinner near the body.

25. The module of claim 2 further comprising an abutment cooperatively arranged with the resilient stop, wherein the resilient stop is capable of contacting the abutment and transferring any load to the abutment.

26. The module of claim 2 further comprising a guide cooperatively arranged with the resilient stop, wherein the guide opens into the aperture.

27. The module of claim 26 wherein the guide comprises a smooth surface.

28. The module of claim 2 wherein the resilient stop comprises first and second bendable members each arranged to bend from the non-extended position toward the apertures to the extended position.

29. The module of claim 2 wherein the resilient stop is disposed at an edge of the body.

30. The module of claim 2 wherein the body is formed from a polymeric material.

31. The module of claim 2 wherein the body is formed from a polymeric material and includes a plurality of apertures, the apertures defining an axis, and wherein the resilient stop is a unitary portion of the body and includes a member which is bendable towards the apertures, the bendable member in the non-extended position being arranged at an obtuse angle to the aperture axis.

32. The module of claim 3 wherein the resilient stop comprises a unitary portion of the body.

33. The module of claim 3 wherein the resilient stop includes a tip portion having a generally rounded shape.

34. The module of claim 3 wherein the resilient stop is free of a tip portion.

35. The module of claim 3 wherein the resilient stop includes a bendable member having a tapered cross section.

36. The module of claim 35 wherein the cross section is thicker near the end of the bendable member and thinner near the body.

37. The module of claim 3 further comprising an abutment cooperatively arranged with the resilient stop, wherein the resilient stop is capable of contacting the abutment and transferring any load to the abutment.

38. The module of claim 3 further comprising a guide cooperatively arranged with the resilient stop, wherein the guide opens into the aperture.

39. The module of claim 38 wherein the guide comprises a smooth face.

40. The module of claim 3 wherein the resilient stop comprises first and second bendable members each arranged to bend from the non-extended position toward the apertures to the extended position.

41. The module of claim 3 wherein the resilient stop is disposed at an edge of the body.

42. The module of claim 3 wherein the body is formed from a polymeric material.

43. The module of claim 3 wherein the body is formed from a polymeric material and includes a plurality of apertures, the apertures defining axis, and wherein the resilient stop is a unitary portion of the body and includes a member which is a bendable towards the apertures, the bendable member in the non-extended position being arranged at an obtuse angle to the aperture axis.

44. The conveyor belt of claim 4 wherein one of the first and second plastic modules comprises a body and the resilient stop comprises a unitary portion of the body.

45. The conveyor belt of claim 4 wherein the resilient stop is arranged to provide increasing reactive force with increasing axial movement of the pivot rod from the first and second plastic modules.

46. The conveyor belt of claim 4 wherein the resilient stop includes a tip portion having a generally rounded shape.

47. The conveyor belt of claim 4 wherein the resilient stop is free of a tip portion.

48. The conveyor belt of claim 4 wherein the resilient stop includes a bendable member having a tapered cross section.

49. The conveyor belt of claim 48 wherein the cross section tapers from a thinner portion to a thicker portion near the end of the resilient stop.

50. The conveyor belt of claim 4 further comprising an abutment cooperatively arranged with the resilient stop, wherein the resilient stop is capable of contacting the abutment and transferring any load to the abutment thereby limiting outward axial movement of the pivot rod from the first and second plastic modules.

51. The conveyor belt of claim 4 wherein the first and second plastic modules include aligned apertures into which the pivot rod is insertable, the conveyor belt further comprising a guide cooperatively arranged with the resilient stop to guide the pivot rod into the apertures.

52. The module of claim 51 wherein the guide comprises a smooth surface arranged to deliver the pivot rod into the apertures.

53. The conveyor belt of claim 4 wherein the resilient stop comprises first and second bendable members arranged to react against the pivot rod with generally opposite forces.

54. The conveyor belt of claim 4 wherein the resilient stop is disposed at an edge of one of the first and second modules.

55. The conveyor belt of claim 4 wherein each plastic module includes a body formed from a polymeric material.

56. The conveyor belt of claim 55 wherein the first and second plastic modules include a plurality of apertures for receiving the pivot rod, the apertures defining an axis, and wherein the resilient stop is a unitary portion of the body of one of the first and second plastic modules and includes a member which is bendable in the direction of insertion of the pivot rod in the apertures, the bendable member in the non-extended position being arranged at an obtuse angle to the aperture axis and providing increasing reactive force with increasing axial movement of the pivot rod out of the apertures.

57. The method of claim 5 wherein bending the resilient stop includes contacting a shaft of the pivot rod against the resilient stop and sliding the shaft along the resilient stop.

58. The method of claim 57 wherein inserting the pivot rod into the apertures further includes sliding the pivot rod along a guide that reacts against the resilient stop and delivers the pivot rod into the apertures.

59. The method of claim 5 wherein inserting the pivot rod into the apertures includes inserting a shaft of the pivot rod into the apertures without bending the resilient stop and wherein bending the resilient stop includes contacting a head of the pivot rod against the resilient stop and sliding the head of the pivot rod along the resilient stop.

60. The method of claim 6 wherein removing the pivot rod from the apertures includes pulling the pivot rod out of the apertures.

61. The method of claim 6 wherein removing the pivot rod from the apertures includes pushing the pushing the pivot rod out of the apertures.

62. The method of claim 6 wherein bending the resilient stop toward a pivot rod includes directing a second pivot rod past the resilient stop and bending the resilient stop to an extended position.

63. The method of claim 7 wherein reacting a resilient stop against axial outward movement of the pivot rod includes increasing reactive force exerted by the resilient stop on the pivot rod with increasing axial outward movement of the pivot rod.

64. The method of claim 63 further comprising contacting the resilient stop against an abutment, thereby transferring any load from the resilient stop to the abutment, and preventing further axial outward movement of the pivot rod.

* * * * *